March 19, 1935.   C. F. SOMMERS   1,995,081
ELECTRICAL PERCOLATOR ATTACHMENT FOR COFFEE URNS
Filed May 20, 1933   3 Sheets-Sheet 1

Inventor
Carter F. Sommers
By Clarence A. O'Brien
Attorney

March 19, 1935. C. F. SOMMERS 1,995,081

ELECTRICAL PERCOLATOR ATTACHMENT FOR COFFEE URNS

Filed May 20, 1933   3 Sheets-Sheet 3

Inventor
Carter F. Sommers

By Clarence A. O'Brien
Attorney

Patented Mar. 19, 1935

1,995,081

UNITED STATES PATENT OFFICE 1,995,081

ELECTRICAL PERCOLATOR ATTACHMENT FOR COFFEE URNS

Carter F. Sommers, San Antonio, Tex.

Application May 20, 1933, Serial No. 672,056

4 Claims. (Cl. 219—43)

This invention relates to coffee brewing machines or urns and has more particular reference to an attachment therefore which will convert the urn into a percolator.

Further, in accordance with the present invention a percolator attachment of the character above mentioned is provided having associated therewith a heating element that is insertable with the percolator into the urn thus obviating the application of heat to the bottom of the urn as is now generally done.

Further in accordance with the present invention there is provided as a part of the attachment a suitable timing device for controlling the circuit to the electrical heater forming part of the attachment.

The invention together with its numerous objects and advantages will be best understood from a study of the following description taken in connection with the accompanying drawings wherein is illustrated a preferred embodiment of the invention.

It is to be understood at the outset that it is in no wise intended to restrict the invention to the precise details of construction, combination and arrangement of elements as herein shown and illustrated other than may be necessary to meet the requirements of the prior art and scope of the appended claims.

Figure 1:
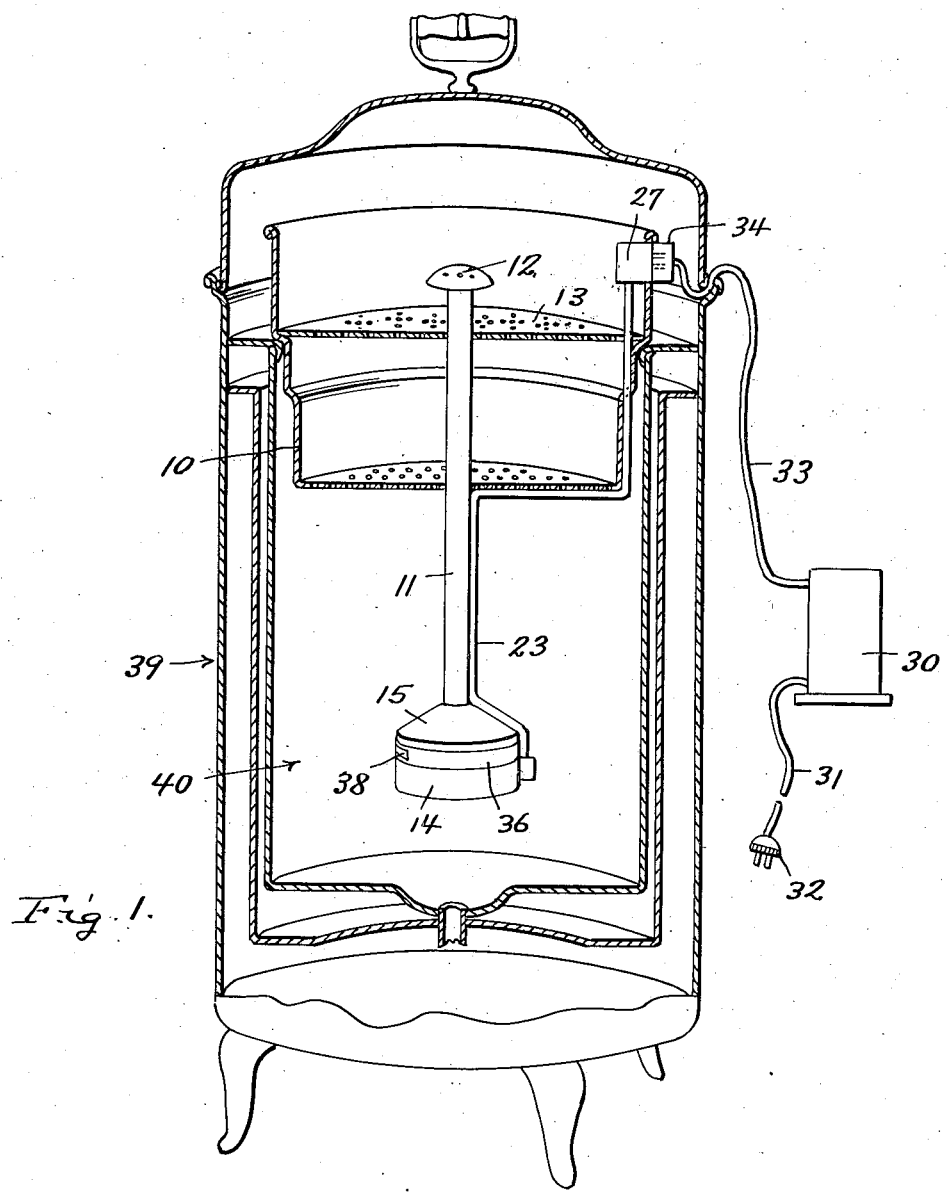
Figure 1 is a vertical sectional view through a conventional type of coffee brewing machine illustrating the application of the invention thereto.

In accordance with the present invention I provide the coffee container or cup 10 usually forming parts of a coffee brewing machine or percolator with a vertical percolating tube 11 provided at its upper end with a spray head 12. In the present instance the upper end of the circulating tube 11 extends through the usual perforated cover 13 provided for the coffee cup or basket 10.

On the lower end of the tube 11 there is provided a casing having a cylindrical body portion 14 and a frusto-conical top 15 secured to the lower end of the stem 11 in any suitable manner. A shell like disk 16 provides a bottom for the casing 14 and is detachably secured therein through the medium of screws or other suitable fastening elements 17. The disk 16 has an opening 18 through the center thereof that is normally closed at its inner end through the medium of a flap valve 19.

Figure 2:
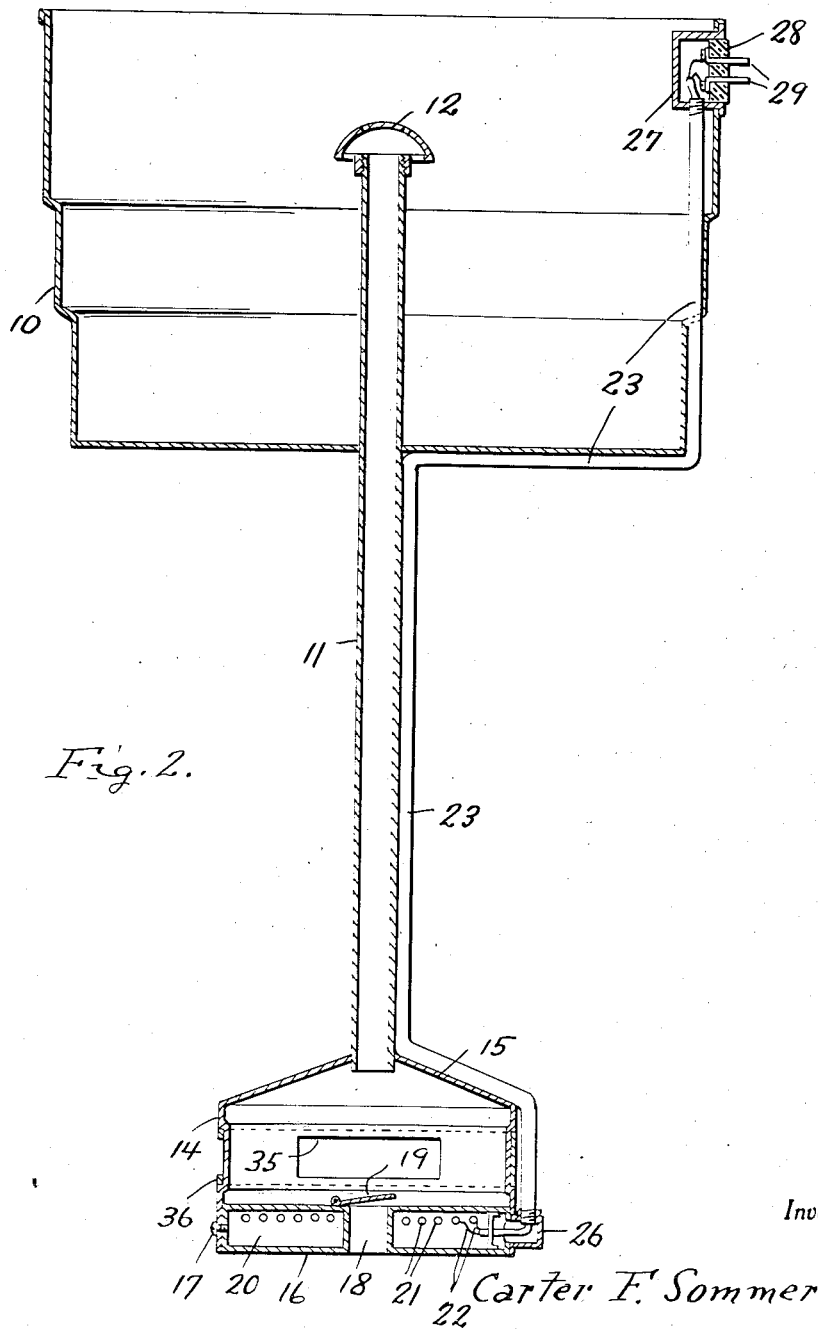
Figure 2 is a sectional elevational view of the percolator attachment.
Figure 3:
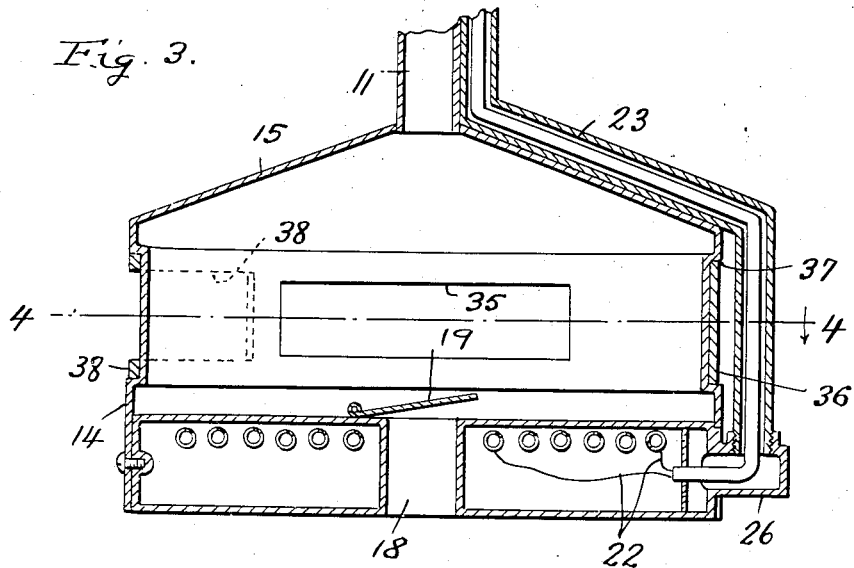
Figure 3 is a fragmentary enlarged vertical sectional view of the lower portion of the attachment.
Figure 4:
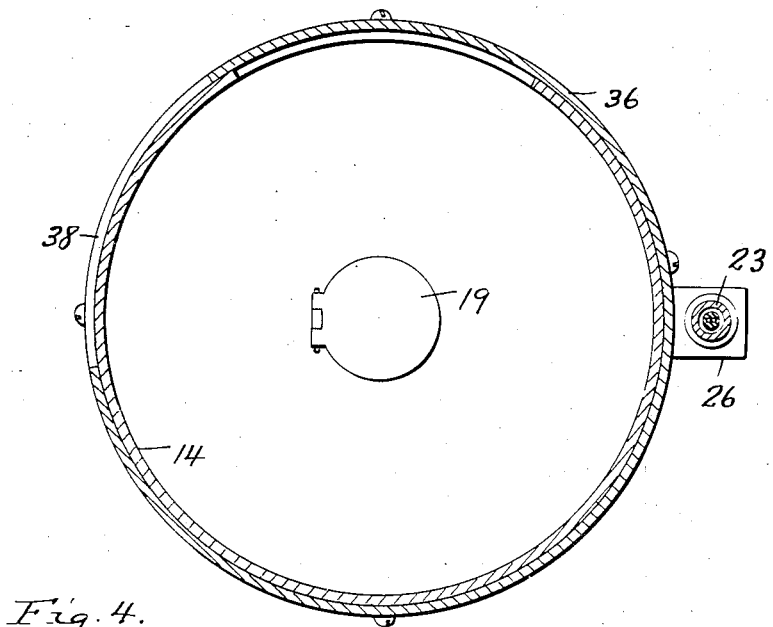
Figure 4 is a horizontal sectional view taken substantially on the line 4—4 of Figure 3.

The disk 16 provides a chamber 20 for an electrical heating element 21 which in the present instance comprises several turns of a coiled resistance wire to which is suitably connected one end of the leads 22. The leads 22 are suitably insulated and protected and extend through a tubular casing 23 that is connected at one end with a nipple 26 suitably provided on the disk 16, and at a relatively opposite end with a box 27 mounted on the wall of the cup or basket 10 adjacent the top of the cup. One side of the box 27 is closed by a plug 28 of insulating material and provided with contact prongs 29 to the inner ends of which the leads 22 are connected as clearly shown in Figure 2.

Further in accordance with the present invention there is provided a timing device 30 which may be of any suitable and standard construction and which is also equipped with an electric cord 31 having associated therewith a plug 32 for engagement with a wall outlet socket, and a second electric cord 33 provided with an electric plug 34 for engagement with the contact fingers 29 for placing the heating element 21 in a main circuit, such as for example a house circuit.

For clean out purposes the wall of the casing 14 is provided with a clean out opening 35 and a closure for the opening 35 is provided, and is in the nature of a band 36 rotatably fitted within a groove 37 provided therefor in the wall of the casing 14. Band 36 is provided with an opening 38 to register with the opening 35 to permit access to the interior of the casing 14 through the opening 35.

In the present instance I have shown the invention as used in conjunction with a coffee brewing machine 39 of a make or type now on the market and which generally employs either gas or electricity for heating purposes, the heating element being suitably provided in the bottom of the coffee brewing machine. With my invention it will be seen that with the cup or basket 10 for containing the ground coffee properly positioned within the machine 39 tube 11 will extend downwardly into the water compartment 40 of the urn with the casing 14 on the lower end of the tube disposed below the level of the water, thus provision being made for placing the heating element 22 entirely within the urn 39. Manifestly water from the chamber 40 of the urn will enter the heater casing 14 through the valve controlled port 18 and the heated water will of course pass upwardly through the tube 11 and discharge into the coffee basket through the spreader or distributor head 12 as and for the purpose obvious to those skilled in the art. As soon as the time or period for which the device is set to operate has elapsed, the timing device 30 will go into operation for interrupting the circuit to the heater 21.

With an attachment of this character it will be possible to control the percolating of coffee in urns for making a uniform coffee at all times, even though by different operators, as in actual practice there will be a specified amount of water in the urn with a like amount of coffee so that the percolating operation would continue for a predetermined period of time.

Having thus described my invention, what I claim as new is:—

1. A percolator embodying a coffee basket and a percolator tube having an upper end extending into the basket and a lower end depending from the bottom of the basket, a heating casing on the lower end of the tube and provided with a hollow bottom providing a closed chamber, said bottom also having an inlet passage therethrough for said casing, a gravity type valve at the inner end of said passage, and an electric heating member arranged within the chamber of said bottom concentrically of said passage.

2. In a percolator, a percolator tube, a coffee basket connected with the tube adjacent the upper end of the latter, a casing connected with the lower end of the tube and provided with an enclosed heating chamber, an electrical heating element in said chamber, said casing having in the bottom thereof an inlet passage substantially alined with said tube, a flap valve controlling said passage internally of said casing, an electrical plug mounted on the wall of said basket, leads connecting the contact prongs of the plug with said heating element, and a tube encasing and protecting said leads.

3. In a percolator, a percolator tube, a coffee basket connected with the tube adjacent the upper end of the latter, a casing connected with the lower end of the tube and provided with an enclosed heating chamber, an electrical heating element in said chamber, said casing having in the bottom thereof an inlet passage substantially alined with said tube, a flap valve controlling said passage internally of said casing, an electrical plug mounted on the wall of said basket, leads connecting the contact prongs of the plug with said heating element, and a tube encasing and protecting said leads, and an automatic timing device electrically connected with said heating device.

4. A percolator unit comprising a basket for the material, a font-tube connected with the basket adjacent the upper end of the tube, a casing at the lower end of the tube having a peripheral wall provided with an opening, a closure for said opening mounted on the wall of the casing for peripheral movement relative thereto, a hollow disk fitted within the casing at the bottom thereof and having a passage therethrough, a valve controlling the passage and opening inwardly of the casing, and a heating element confined within the hollow of said disk.

CARTER F. SOMMERS.